United States Patent
Islam et al.

(10) Patent No.: US 6,195,727 B1
(45) Date of Patent: Feb. 27, 2001

(54) COALESCING RAID COMMANDS ACCESSING CONTIGUOUS DATA IN WRITE-THROUGH MODE

(75) Inventors: Shah Mohammad Rezaul Islam, Cary; Linda Ann Riedle, Apex, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,714

(22) Filed: Mar. 31, 1999

(51) Int. Cl.$^7$ .............................. G06F 11/20; G11B 17/22
(52) U.S. Cl. ........................ 711/114; 711/154; 711/158; 711/168; 714/6
(58) Field of Search .................................... 711/114, 112, 711/4, 154, 158, 162, 168; 714/6, 7

(56) References Cited

U.S. PATENT DOCUMENTS

| | | | |
|---|---|---|---|
| 5,446,855 | * | 8/1995 | Dang et al. ............................... 711/1 |
| 5,574,855 | * | 11/1996 | Rosich et al. ........................... 714/41 |
| 5,727,181 | * | 3/1998 | Beglin et al. .......................... 711/114 |
| 5,758,187 | * | 5/1998 | Young ..................................... 710/24 |
| 5,860,091 | * | 1/1999 | DeKoning et al. ................... 711/114 |
| 5,892,969 | * | 4/1999 | Young ..................................... 710/5 |
| 6,112,277 | * | 8/2000 | Bui et al. .............................. 711/114 |

* cited by examiner

Primary Examiner—Do Hyun Yoo
Assistant Examiner—Hong Kim
(74) Attorney, Agent, or Firm—Martin J. McKinley

(57) ABSTRACT

A redundant array of inexpensive disks (RAID) includes a plurality of disk drives organized as a plurality of stripes, wherein each stripe includes a plurality of stripe units. A host processor system sends write commands in write-through mode to a RAID controller, some of which are immediately processed by the controller, and others of which are temporarily stored in a stash. Commands stored in the stash for data writes that only partially fill a stripe may be coalesced with another write command that also only partially fills the same stripe. This coalescing occurs for commands for data writes that span one or more stripes, and that may start or stop in the middle of a stripe, as well as in the middle of a stripe unit. In addition, two different commands for writing data to different stripe units, but from the same stripe, can also be coalesced. The coalescing of write commands in the stash reduces the number of disk I/O's and improves data throughput.

2 Claims, 3 Drawing Sheets

|  | Drive 1 | Drive 2 | Drive 3 | Drive 4 | Drive 5 |
|---|---|---|---|---|---|
| STRIPE 1 | 1 / 1 | 1 | 1 | 1 | P |
| STRIPE 2 | P | 1 / 2 | 2 | 2 | 2 |
| STRIPE 3 | 2 / 3 | P | 3 | 3 | 3 |
| STRIPE 4 | 3 | | P | | |
| STRIPE 5 | | | | P | |
| STRIPE 6 | 4 | 5 | 6 | 7 | P |

FIGURE 1

COALESCING RAID COMMANDS ACCESSING CONTIGUOUS DATA IN WRITE-THROUGH MODE

BACKGROUND OF THE INVENTION

This invention pertains to computer systems and other information handling systems and, more particularly, to a RAID controller for coalescing write-through commands received from a host and temporarily stored in a stash.

RAID Overview

As the performance of microprocessor and semiconductor memory technology increases, there is a need for improved magnetic disk storage technology with comparable performance enhancements. Unfortunately, the performance of newer processor and semiconductor memory technology has out paced that of magnetic disk storage technology. In 1988, however, a paper published by Patterson, Gibson and Katz ("A Case For Redundant Arrays Of Inexpensive Disks (RAID)"; International Conference On Management Of Data; pp. 109–116; June 1988) laid the foundation for the use of a redundant array of inexpensive disks ("RAID") that would not only significantly improve the data transfer rate and data I/O rate over a comparable single disk access, but would also provide error correcting redundancy and lower cost. In their paper, Patterson, Gibson and Katz described five "levels" of RAID systems, which are briefly described below (RAID-1 through RAID-5). Since that time, other RAID levels have been described, two of which are also briefly described below (RAID-0 and RAID-6).

Most RAID systems incorporate both redundancy and some form of data interleaving, which distributes the data over all the data disks in the array. Redundancy is usually in the form of an error correcting code, with simple parity schemes predominating. However, RAID-1 uses a "mirroring" redundancy scheme in which duplicate copies of the same data are stored on two separate disks in the array. Parity and other error correcting codes are either stored on one or more disks dedicated for that purpose only, or they may be distributed over all the disks in the array. Data interleaving is usually in the form of data "striping" in which the data to be stored is broken down into blocks called "stripe units", which are then distributed across the data disks. A typical size of a stripe unit is 8K to 64K Bytes. A "stripe" is a group of corresponding stripe units, one stripe unit from each disk in the array. Thus, the "stripe size" is equal to the size of a stripe unit times the number of data disks in the array. Data interleaving may also be accomplished on a bit-by-bit basis, such as is described in more detail below with regards to RAID-3. Six RAID levels will now be described.

RAID-0 utilizes data striping, but does not use redundancy. RAID-0 has a lower cost than any other RAID level, and its write performance is the best because there is no writing of redundant information. The primary disadvantage of RAID-0 is its lack of redundancy. Consequently, any single disk failure in the array results in lost data.

RAID-1 uses mirroring in which identical data is stored on two disks. An advantage of RAID-1 is that it is simple to implement in software. RAID-1 is also error correcting because complete recovey is possible from the failure of any one disk drive by simply switching to the drive that contains the duplicate copy of the data. After replacing the defective drive, the data on the duplicate drive can be recopied to the replacement drive. When servicing two or more requests to read data that is stored on the same disk, RAID-1 has a faster read rate than RAID-0 because one request can be serviced from the first disk, and the second request can be simultaneously serviced by the duplicate disk. A disadvantage of RAID-1 is that it is expensive because it requires two times the number of drives necessary to stored the same data. Thus, its efficiency is always ½. The necessity of making duplicate copies of all data also makes this RAID level somewhat slow to write data.

RAID-2 uses error correcting codes such as those found in error correcting semiconductor memory systems.

RAID-3 uses a separate parity disk to store error correcting parity information and a plurality of data disks that contain bit interleaved data information. Unlike semiconductor memories, a faulty disk drive is usually easily identified because disk drives and their associated controllers typically contain sophisticated error detecting mechanisms that can quickly identify a failed drive. Consequently, if a single data drive has failed, the contents of the failed drive can be easily reconstructed using the information from the "good" data drives plus the parity drive. Conceptually, the reconstruction of a specific bit of a failed drive could be accomplished by calculating the parity of the corresponding bit of each of the "good" drives and then comparing it to the corresponding bit of the parity drive. For example, if the parity of the first bit of each of the "good" drives is a logical 0, and the first bit of the parity drive is a logical 1, then the first bit of the failed drive must have been a logical 1 (because the parity of the first bit of all the data drives must equal logical 1, in this example). Mathematically speaking, the data on the failed disk can be calculated by starting with the parity information from the parity drive and subtracting, modulo two, the corresponding information on the "good" data drives. If, on the other hand, the parity drive fails, parity is easily reconstructed from all the data drives.

For this RAID level, data is bit interleaved on the data disks. For example, a basic RAID-3 system in which data is organized in 8 bit bytes and having 8 data disks and one parity disk would store the first bit of every byte on the first disk, the second bit of every byte on the second disk, on so on. Thus, a write request simultaneously accesses all 8 data disks plus the parity disk, while a read request accesses all 8 data disks. Consequently, the data rate, which is the rate at which data can be written to or read from sequential locations on the disk without head repositioning, is very high for RAID-3. A primary disadvantage of this RAID level is that it only permits one request to be serviced at any one time. RAID-3 systems also have relatively low I/O rates, which is the rate at which data can be written to random locations on the disk, thereby requiring frequent head repositioning.

RAID-4 also uses a separate parity disk to store error correcting parity information and a plurality of data disks that contain interleaved data information. Unlike RAID-3, in which data is bit interleaved across the data disks, RAID-4 uses block interleaving or data striping, which is described in more detail above.

The performance of RAID-4 is particularly dependent on the type of access requested, read or write, and the size of the requested access relative to the size of the stripe unit and the size of the stripe. A request to read a block of data that is contained entirely within one stripe unit can be quickly serviced as soon as the disk drive containing the requested data becomes available. Consequently, multiple requests to read various blocks of data, each of which is entirely contained within one stripe unit on a different data drive, can be serviced simultaneously. In contrast, a RAID-3 system must service multiple requests serially, and if head repositioning is required between the servicing of each request, the performance of a RAID-3 system will be dramatically slower than a RAID-4 system for this type of access. A read operation of stripe size data blocks can also be very fast in RAID-4, particularly if scheduling permits all data disks to be accessed at one time.

A request to write data to a single stripe unit can be a relatively slow process, because it requires four disk accesses. Specifically, a data write to a single stripe unit requires that the old data and corresponding parity information be read from the appropriate data disk and the parity disk. Next, new parity information is computed using the old data, the new data and the old parity. Finally, the new data and the new parity are written to the data and parity disks, respectively. Requests for multiple writes to various stripe units located on different drives and in different stripes is even more problematic, because each write requires a read and write operation to the parity disk and, since there is only one parity disk, it can become "bottle necked." Writing an entire stripe of data is much easier because no read operations are required and the parity for the new stripe of data is easily computed.

RAID-5 is similar to RAID-4 in that it interleaves data by stripe units across the various disk drives, and also stores error correcting parity information. In RAID-5, however, there is no dedicated parity disk as there is in RAID-3 and RAID-4. Instead, RAID-5 distributes parity across all the disk drives, thereby eliminating the parity disk bottleneck problem described above with regards to certain write operations of RAID-4 systems. Furthermore, because RAID-5 distributes data over all the disks, and RAID-4 only distributes data over the data disks (which is equal to the total number of disks minus the total number of parity disks), RAID-5 has a slight performance advantage over RAID-4. With these performance enhancements, RAID-5 is usually preferred over RAID-4 and, consequently, most RAID-4 systems have disappeared from the market to be replaced by RAID-5 systems.

RAID-6 is similar to RAID-5 in that it interleaves data in stripe units and distributes parity information across all the disk drives. A disadvantage of RAID-5, as well as RAID-3 and RAID-4, is its inability to correct a failure in more than one single disk. As the size of disk arrays increases, however, the probability of a failure in more than one drive also increases which, in turn, increases the chance of an unrecoverable failure. To overcome the problem of a two disk failure, RAID-6 uses Reed-Solomon codes in a P+Q redundancy scheme that can recover from a failure of any two disks. One disadvantage of RAID-6 over RAID-5, however, is in the write performance of small amounts of data on the order of one stripe unit in size. Recall that writes of small amounts of data are slow in RAID-5 because four data accesses are required. For such small write operations, RAID-6 is even more inefficient because it requires a total of six accesses to update both the "P" and "Q" information.

Write-Through and Write-Back Modes

To write data from the host computer to the RAID array, the host usually passes write commands to a RAID controller which, in turn, processes the commands and transfers the data from the host system to the disk array; for example, using a DMA or direct memory access process. Data is usually written in either a user selectable "write-through" mode, or in a "write-back" mode. In the write-through mode, data is normally written to the disk array immediately after the controller receives the write command; provided that the controller has the capability to keep up with the flow of commands received from the host. If more commands are received than can be currently processed by the RAID controller, the "overflow" is temporarily stored in a "stash."

In the write-back mode, data to be stored in the disk array is "cached" in a disk cache memory and usually written to the disk array only when the number of pages of cache memory exceeds a predetermined number (for example, one third of the total number of cache pages). Pointers to the most recently used ("MRU") and least recently used ("LRU") pages of cache memory are maintained, and each page of cache memory contains a pointer to the next most recently used page of cache memory. When the total number of cache pages exceeds the aforementioned limit, the LRU data is written to the disk array. While the write-through mode can also use a disk cache memory, an advantage of the write-back mode is that data from multiple write commands that modify the same or contiguous data can be written to disk simultaneously, thereby reducing the number of I/O's to the disk array.

In the writing of blocks of data to the disk array, it would be ideal if each block of data were bounded on the edges of a stripe. However, blocks of data to be written to the disk array often start and stop not only somewhere in the middle of a stripe, but frequently in the middle of a stripe unit. This concept is illustrated in FIG. 1, which is a schematic representation of a RAID-5 system. Referring to this figure, an array of five disk drives DRIVE 1 through DRIVE 5 is represented by the five columns, and six stripes STRIPE 1 through STRIPE 6 are represented by the six rows. The letter "P" in certain stripe units indicates that that particular stripe unit stores the parity information for the corresponding stripe. The numbers 1 through 7 refer to particular write commands, and each of the numbers is positioned in the stripe unit "box" into which its corresponding data is to be written. For example, write command 4 instructs the RAID controller to write certain specified data into the first stripe unit of STRIPE 6, and command 5 instructs the controller to write certain data into the second stripe unit of STRIPE 6. The data for write command 1, however, not only spans more than one stripe, but also starts in the middle of the first stripe unit of STRIPE 1 and ends in the middle of the first stripe unit of STRIPE 2. In a similar manner, the data for write commands 2 and 3 terminate in the middle of a stripe unit.

In the write-through mode, the inefficiency of the process of writing data to disk as soon as the command is received from the host is readily apparent from an examination of the example of STRIPE 2 in FIG. 1. First, the data from command 1 would be written to the first stripe unit of STRIPE 2 (for STRIPE 2, the first stripe unit is on DRIVE 2), followed by a write of the updated parity information for STRIPE 2, thereby requiring four disk I/O's (two reads and two writes). Next, the four units of data from command 2 are written to the first, second, third and fourth stripe units of STRIPE 2, along with a write of the parity information; thereby requiring an additional five I/O's. Thus, a total of nine I/O's are required to write the new data into STRIPE 2.

Accordingly, in the write-through mode, the invention described below coalesces data write commands stored in the stash in order to reduce the number of disk I/O's and to speed up the data throughput to the disk array.

SUMMARY OF THE INVENTION

Briefly, the invention is a method for coalescing RAID write commands received from a host for data to be stored in an array of disk drives, wherein the array of disk drives is organized as a multiplicity of stripes, and wherein each stripe is composed of a plurality of stripe units. The method includes the following steps. Receiving a multiplicity of "X" commands followed by a multiplicity of "Y" commands from a host, wherein "X" and "Y" are integers and wherein each of the "X" and "Y" commands are write commands for writing data, as specified by each of the "X" and "Y" commands, to an array of disks. Processing the "X" commands and storing the "Y" commands in a stash. Finding a first command of the "Y" commands stored in the stash for writing a partial stripe to a first stripe of the array of disks. Finding a second command of the "Y" commands stored in the stash for writing data to the first stripe. Determining if the second command also writes data to a second stripe of the array of disk drives, wherein the second stripe is different from the first stripe. If the second command does not write data to a second stripe different from the first stripe, changing the first command to also write the data from the second command. Tying the first and second commands together. If the second command does write data to a second stripe different from the first stripe, changing the first command to also write the first stripe data from the second command, and changing the second command to exclude the first stripe data from the second command. And tying the first and second commands together. An apparatus that implements these steps is also described.

BRIEF DESCRIPTION OF THE DRAWINGS

FIG. 1 is a schematic diagram of a RAID 5 array of disk drives that illustrates the stripe and stripe unit into which data specified in write commands 1 through 7 is to be written.

DESCRIPTION OF THE ILLUSTRATIVE EMBODIMENT

Figure 2:
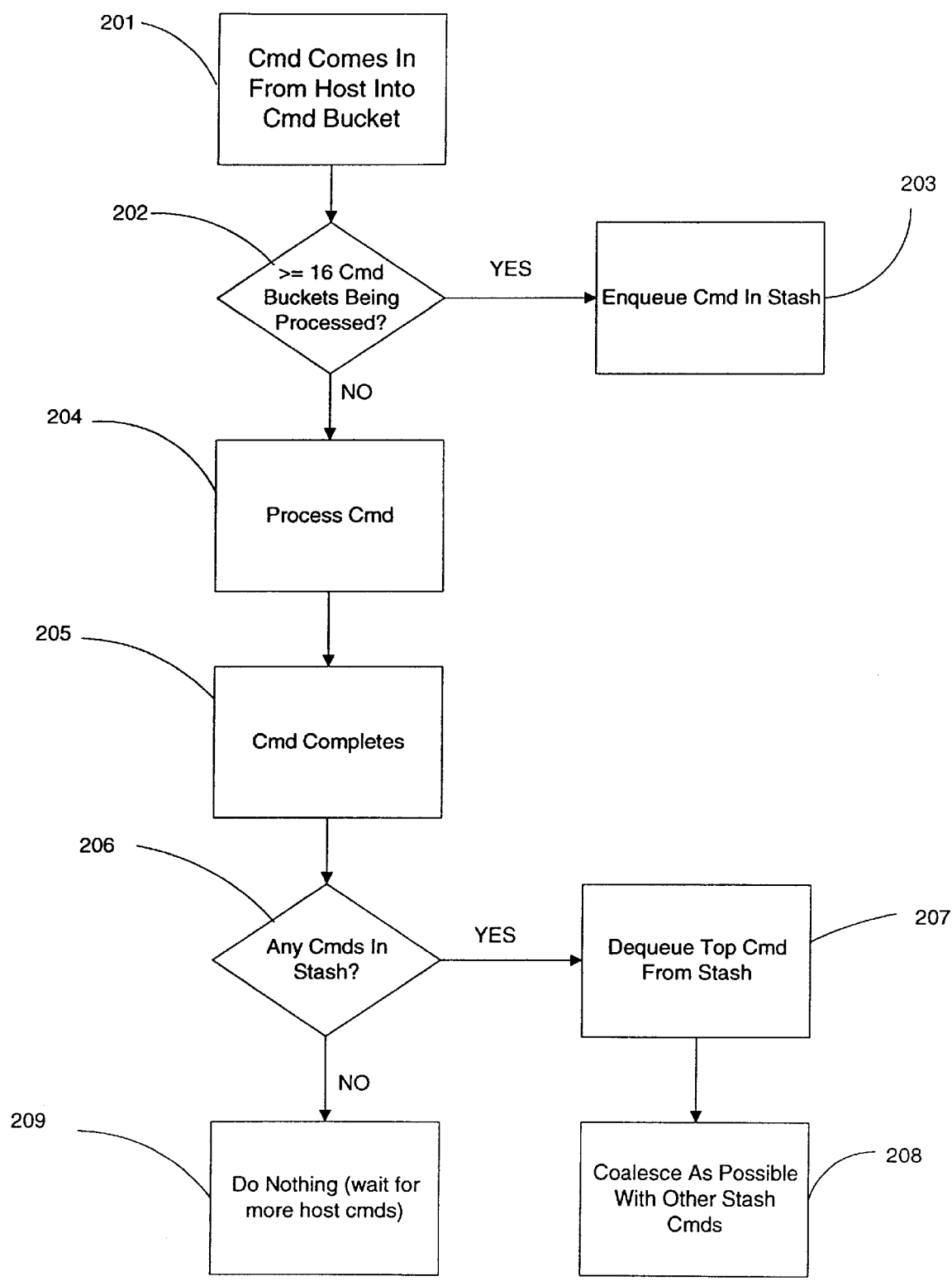
FIG. 2 is a flow chart that illustrates the process by which the RAID controller receives write commands from the host, processes some of these commands and stores others in the stash, and then de-queues commands from the stash for possible coalescing.
Figure 3:
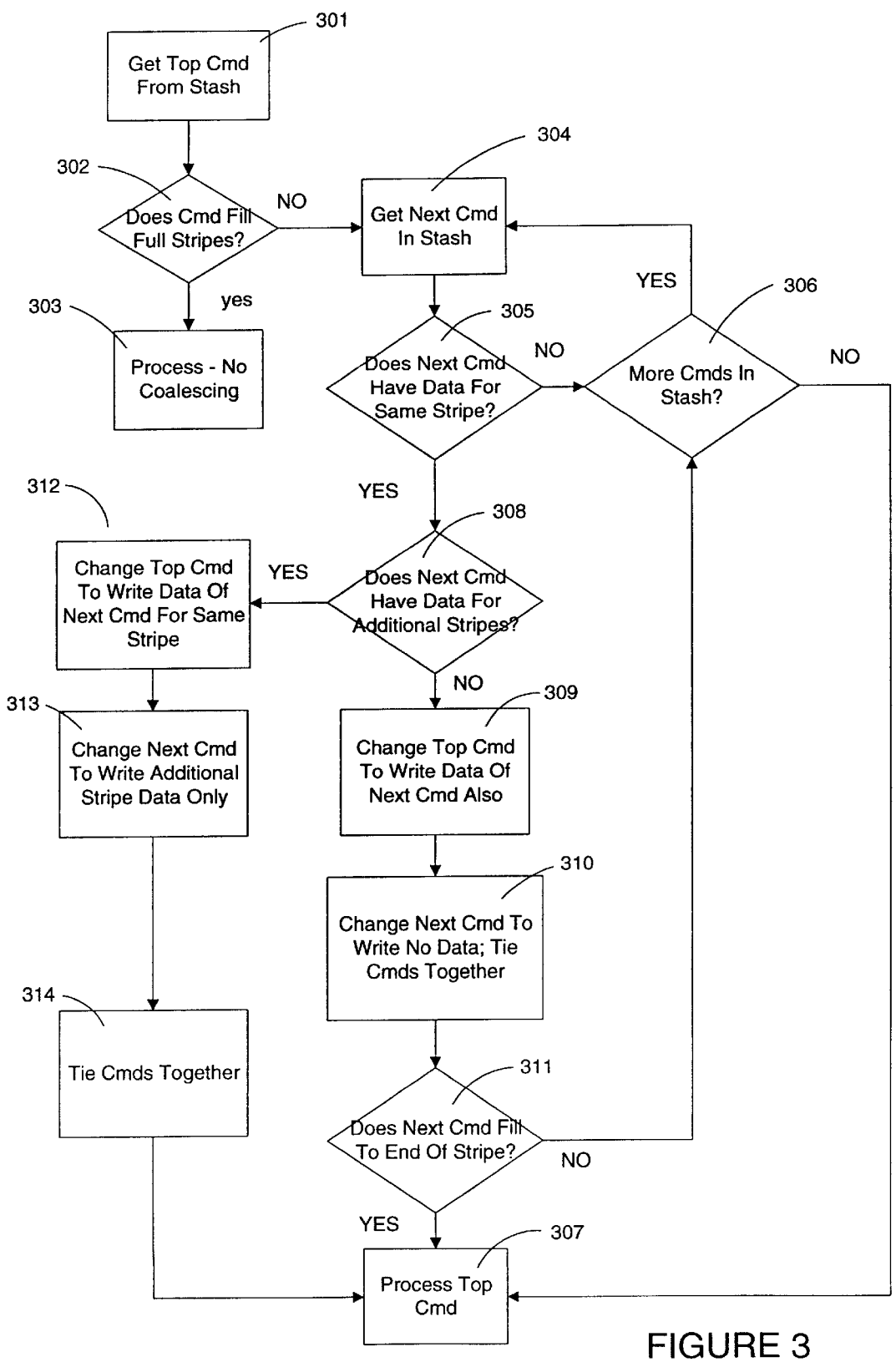
FIG. 3 is a flow chart of the process by which commands on the stash are coalesced.

FIG. 2 is a flow chart that illustrates, among other things, the process by which the RAID controller receives write commands in write-through mode and processes these commands for possible coalescing, as further described in FIG. 3. Preferably, this process, as well as the process of FIG. 3, is implemented in and controlled by the RAID controller's processor, although other dedicated digital circuitry could also be used. Referring to FIG. 2, in step 201 the RAID controller receives into "buckets", from the host processor or other computer or information processing system, write commands in write-through mode. In step 202, the controller processes the first 16 write commands, and sends any "overflow" (greater than 16 write commands) to a stash in step 203. While the number 16 has been used in this exemplary embodiment, other systems may enqueue write commands in the stash after another threshold (other than 16) has been reached. In step 204, the controller processes the commands in the command buckets and, when one of the commands has been completed at step 205, the process than looks for commands in the stash in step 206. If no commands are found in the stash, the process branches to step 209 wherein the controller waits for more commands from the host. If, in step 206, commands are found in the stash, the process branches to step 207 wherein the top command is de-queued from the stash. In next step 208, attempts are made to coalesce the de-queued command with other commands in the stash, as further described in FIG. 3.

FIG. 3 is a flow chart of the process by which write commands in the stash are coalesced. Referring to this figure, in step 301 the process gets the top command from the stash. In step 302, a check is made to determine if the data corresponding to the top command fills a full stripe. If it does, as indicated in step 303, no coalescing occurs. If step 302 indicates that the data corresponding to the write command does not fill a full stripe, the process branches to step 304 wherein the "next" command is retrieved from the stash. If, in next step 305, the next command does not have data for the same stripe as the "top" command, the process branches to step 306. If there are more commands in the stash, the process branches from step 306 back to step 304, where a new next command is taken from the stash. If no more commands are on the stash, the process branches from step 306 to step 307.

If, however, in step 305, the next command has data for the same stripe as the top command but no data for additional stripe (step 308), the process branches to step 309 wherein the top command is changed to also include (in addition to the data from the top command) a write of the data from the next command. In next step 310, the next command is changed to write no data, and then the two commands are "tied together." This tying process ensures that parity is not calculated for the top command until data has been transferred from the host for the next command, and that an acknowledge is not sent back to the host for the next command until the top command is finished. In next step 311, the process looks at the next command in the stash and, if this command does not fill to the end of the stripe, the process branches back to step 306; otherwise, the process branches to step 307.

The term "same stripe" is used to indicate the stripe in common with the top and next commands, while the term "additional stripes" refers to stripes other than the same stripe. Returning to step 308, if the next command has data for additional stripes, the process branches to step 312, wherein the top command is changed to also write (i.e., in addition to the data for additional stripes contained the top command) the data for the same stripe contained in the next command. In next step 313, the next command is changed to write the additional stripe data only; i.e., data from the same stripe is removed from the second command. In next step 314, the top and next commands are tied together, as described above.

We claim as or invention:

1. In a RAID controller, a method of coalescing RAID write commands received from a host for data to be stored in an array of disk drives, wherein the array of disk drives is organized as a multiplicity of stripes, and wherein each stripe is composed of a plurality of stripe units, said method of coalescing comprising the steps of:

(a) receiving a multiplicity of "X" commands followed by a multiplicity of "Y" commands from the host, wherein "X" and "Y" are integers and wherein each of the "X" and "Y" commands are write commands for writing data, as specified by each of the "X" and "Y" commands, to the array of disk drives;

(b) processing the "X" commands and storing the "Y" commands in a stash;

(c) finding a first command of the "Y" commands stored in the stash for writing a partial stripe to a first stripe of the array of disk drives;

(d) finding a second command of the "Y" commands stored in the stash for writing first data to the first stripe;

(e) determining if the second command also writes second data to a second stripe of the array of disk drives, the second stripe being different from the first stripe;

(f) if the second command does not write the second data to the second stripe, changing the first command to also write the first data from the second command;

(g) tying the first and second commands together;

(h) if the second command does write the second data to the second stripe, changing the first command to also write the first data from the second command, and changing the second command to exclude the first data from the second command; and (i) tying the first and second commands together.

2. A RAID controller for coalescing RAID write commands received from a host, wherein each of the RAID write commands defines data to be stored in an array of disk drives, wherein the array of disk drives is organized as a multiplicity of stripes, and wherein each stripe is composed of a plurality of stripe units, said controller comprising:

means for receiving a multiplicity of "X" commands followed by a multiplicity of "Y" commands, wherein "X" and "Y" are integers and wherein each of the "X" and "Y" commands are write commands for writing data, as specified by each of the "X" and "Y" commands, to the array of disk drives;

a stash for storing commands;

means for processing the "X" commands and means for storing the "Y" commands in the stash;

means for finding a first command of the "Y" commands stored in the stash for writing a partial stripe to a first stripe of the array of disk drives;

means for finding a second command of the "Y" commands stored in the stash for writing first data to the first stripe;

means for determining if the second command does not write second data to a second stripe, including means for changing the first command to also write the first data from the second command and for tying the first and second commands together; and means for determining if the second command does write the second data to the second stripe, including means for changing the first command to also write the first data from the second command, and for changing the second command to exclude the first data from the second command, and for tying the first and second commands together.

* * * * *